US011301798B2

(12) United States Patent
Malpani

(10) Patent No.: US 11,301,798 B2
(45) Date of Patent: Apr. 12, 2022

(54) COGNITIVE ANALYTICS USING GROUP DATA

(71) Applicant: International Business Machines Corporation, Armonk, NY (US)

(72) Inventor: Ravi Malpani, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 16/381,140

(22) Filed: Apr. 11, 2019

(65) Prior Publication Data

US 2020/0327474 A1    Oct. 15, 2020

(51) Int. Cl.
*G06Q 10/06* (2012.01)
*G06N 20/00* (2019.01)

(52) U.S. Cl.
CPC ....... *G06Q 10/06393* (2013.01); *G06N 20/00* (2019.01)

(58) Field of Classification Search
CPC .............. G06Q 10/06393; G06N 20/00
See application file for complete search history.

(56) References Cited

U.S. PATENT DOCUMENTS 9,754,233 B1    9/2017  Hamouda
9,760,601 B2    9/2017  Burke et al.
2003/0208388 A1 * 11/2003 Farkas ............... G06Q 10/10
                                                      705/7.39
2007/0203786 A1 *  8/2007 Nation ............... G09B 7/02
                                                      705/7.42
2008/0312942 A1 * 12/2008 Katta ................ G06Q 10/04
                                                      705/7.34

(Continued)

FOREIGN PATENT DOCUMENTS

CN        107408265 A  * 11/2017  ......... G06F 16/951

OTHER PUBLICATIONS

Epstein, Marc J. Performance Measurement and Management Control: Improving Organizations and Society vol. 16. Elsevier, 2006. (Year: 2006).*

(Continued)

*Primary Examiner* — Mehmet Yesildag
*Assistant Examiner* — Jeremy L Gunn
(74) *Attorney, Agent, or Firm* — Edell, Shapiro & Finnan, LLC

(57) ABSTRACT

A method, a system, and a computer program product are provided for performing cognitive analytics. Human resource information for respective groups of a business unit of an organization may be extracted from stored business information. The human resource information may include, for employees of the respective groups, salary information and employee experience information. For the respective groups, cost information, productivity information, quality information, and attrition data may be extracted from the business information. At least the human resource information, the cost information, the productivity information, the quality information, and the attrition data may be provided, for the respective groups, to a model trained via machine learning. The model may produce respective scores for the groups. The groups may be ranked based at least partly on the respective scores and the ranking of the groups may be output.

17 Claims, 8 Drawing Sheets

(56) References Cited

U.S. PATENT DOCUMENTS

| | | |
|---|---|---|
| 2012/0130768 A1 | 5/2012 | Rajagopal et al. |
| 2013/0132162 A1* | 5/2013 | Banerjee ............ G06Q 10/0637 |
| | | 705/7.36 |
| 2014/0058801 A1* | 2/2014 | Deodhar ............ G06Q 10/0639 |
| | | 705/7.38 |
| 2015/0317576 A1* | 11/2015 | Bonner .............. G06Q 10/0635 |
| | | 705/7.28 |
| 2017/0154291 A1* | 6/2017 | Dau ................. G06Q 10/06393 |
| 2018/0225620 A1 | 8/2018 | Cantrell et al. |
| 2019/0012167 A1* | 1/2019 | Boss ........................ G06F 8/70 |

OTHER PUBLICATIONS

English translation of Chinese Patent Application CN 107408265; retrieved from Espace.net on Sep. 2, 2021 (Year: 2016).*

* cited by examiner

COGNITIVE ANALYTICS USING GROUP DATA

BACKGROUND

1. Technical Field

Present invention embodiments relate to a method, a system, and a computer program product for performing cognitive business analytics. In particular, the present invention embodiments relate to a method, a system, and a computer program product for using artificial intelligence to suggest ways to improve performance of an organization. The embodiments determine and output return on investment, perform business analytics to rank groups within a business unit of an organization, and recommend locations for business expansion and/or business continuity.

2. Discussion of the Related Art

Today, business analytics help business organizations make smarter, more strategic and more informed business and human resource decisions. However, managers in large business units of a business organization have no knowledge regarding differences in similar processes across a same business unit that may span other regions and/or other countries. Further, the managers have no knowledge regarding how their particular groups are performing with respect to other groups of the business unit. Further, business leaders lack full visibility regarding which group is performing better than other groups with respect to group size, demographics, salary, business results, sustainability, etc. In addition, business leaders do not have any information regarding where the business organization or business unit should invest over a given time period to obtain a best return on investment.

SUMMARY

According to one embodiment of the present invention, a computer-implemented method is provided for performing cognitive business analytics. A processing device extracts, for respective groups of a plurality of groups of a business unit of an organization, human resource information from stored business information. The human resource information for employees of the respective groups includes salary information and employee experience information. The processing device extracts, for the respective groups, cost information, productivity information, quality information, and attrition data from the business information. The processing device provides, for the respective groups, at least the human resources information, the cost information, the productivity information, the quality information, and the attrition data to a model trained via machine learning. The model produces respective scores for the groups. The groups are ranked, by the processing device, based at least partly on the respective scores. The processing device outputs the ranking of the groups.

According to a second embodiment of the present invention, a system for performing cognitive analytics is provided. The system includes at least one processor and a memory connected with the at least one processor. The at least one processor is configured to extract, for respective groups of a plurality of groups of a business unit of an organization, human resource information from stored business information. The human resource information includes, for employees of the respective groups, salary information and employee experience information. The at least one processor is further configured to extract, for the respective groups, cost information, productivity information, quality information, and attrition data from the business information. The at least one processor provides at least the human resources information, the cost information, the productivity information, the quality information, and the attrition data to a model, trained via machine learning, to produce respective scores for the groups. The groups are ranked based at least partly on the respective scores and the ranking of the groups is output.

According to a third embodiment of the present invention, a computer program product is provided. The computer program product includes at least one computer readable storage medium having computer readable program code embodied therewith for execution on at least one processor of a computing device. The computer readable program code is configured to extract, for respective groups of a plurality of groups of a business unit of an organization, human resource information from stored business information. The human resource information includes, for employees of the respective groups, salary information and employee experience information. Further, the computer readable program code is configured to extract, for the groups, cost information, productivity information, quality information, and attrition data from the business information. At least the human resources information, the cost information, the productivity information, the quality information, and the attrition data are provided to a model, which is trained via machine learning, to produce respective score for the groups. The computer readable program code is further configured to rank the groups based at least partly on the respective scores and output the ranking of the groups.

BRIEF DESCRIPTION OF THE DRAWINGS

Generally, like reference numerals in the various figures are utilized to designate like components.

DETAILED DESCRIPTION

Figure 1:
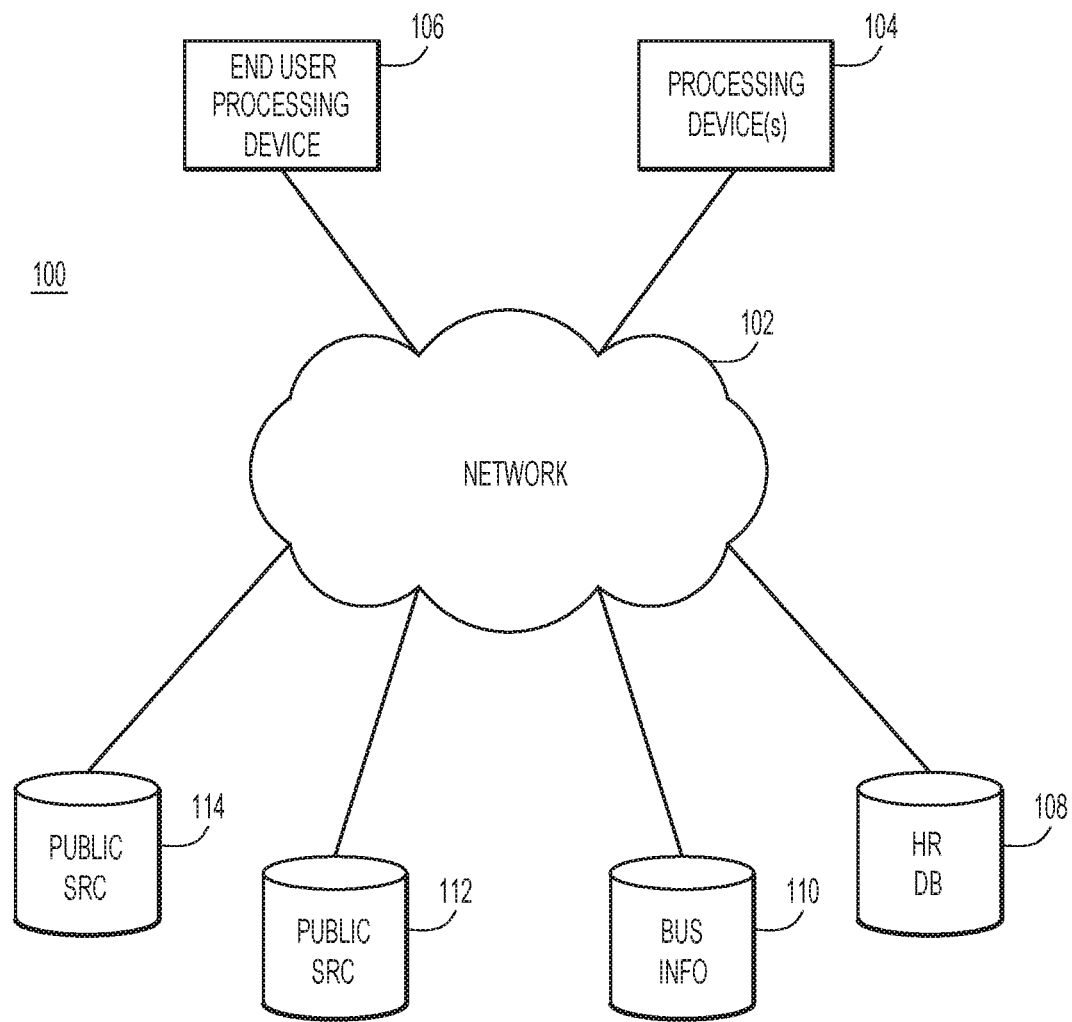
FIG. 1 shows an example operating environment according to embodiments of the invention.

According to various embodiments of the invention, human resource information may be extracted from stored business information for each respective group of a business unit of a business organization. For each employee of the respective group, the human resource information may include, but not be limited to, employee/user features or attributes, salary information, employee skills, and employee experience information. Further, cost information, productivity information, turnaround time, quality information and attrition data may be extracted for the each respective group from the business information. In addition, according to the various embodiments, the groups of the business unit may be ranked based on at least the human resources information, the cost information, the productivity information, the quality information and the attrition data.

In some embodiments, business data of one or more competitors may be obtained, or mined, from one or more public sources including, but not limited to, competitor annual reports, publicly available business databases, news releases, etc. The business data may be compared to business data of the business organization related to one or more products and/or one or more services common to respective competitors of the one or more competitors and the business organization. A report may be produced that indicates one or more business metrics of the business organization that lag behind one or more corresponding business metrics of the one or more competitors based on the comparing. Embodiments may use artificial intelligence to provide one or more suggestions for improving performance of the organization based on the one or more business metrics of the organization included in the report.

According to some embodiments of the invention, public sources may be mined for business data related to products produced by the business organization and/or services provided by the business organization, competitor business data and region-specific data and one or more locations for business expansion or for business continuity may be recommended based on analysis of the mined business data, competitor business data and region-specific business data.

In various embodiments, a performance measurement may be calculated for each of the respective groups of the business unit. The various embodiments may suggest rewarding one or more managers that are each associated with one or more groups of the business unit having a respective performance measurement that exceeds a threshold. The reward may include, but not be limited to, a bonus and/or a promotion. The threshold may be a respective performance measurement of a group exceeding a predefined percentage of the respective performance measurements of other groups of the business unit. For example, if the threshold is set to 99%, then the various embodiments may suggest rewarding one or more managers that are each associated with one or more groups of the business unit that have a respective performance measurement that exceeds 99% of performance measurements of other groups of the business unit. A different threshold may be defined for other embodiments. The performance measurement may be calculated using a model, trained via machine learning, to produce a score.

An example environment 100 for use with present invention embodiments is illustrated in FIG. 1. Specifically, environment 100 may include a network 102 and, connected thereto, one or more processing devices 104, one or more end user processing devices 106, a human resources database 108, a business information database 110, and public information sources 112, 114.

Network 102 may be implemented by any number of any suitable communications media (e.g., wide area network (WAN), local area network (LAN), Internet, Intranet, etc.).

One or more processing devices 104 and one or more end user processing devices 106 may be remotely located from each other and may communicate with each other via network 102. Alternatively, one or more processing devices 104 and one or more end user processing devices 106 may be local to each other, and may communicate via any appropriate local communication medium (e.g., local area network (LAN), hardwire, wireless link, Intranet, etc.). In this specification, a reference to processing device 104 can be interpreted as referring to either a single processing device 104 or multiple processing devices 104 working together in a distributed fashion.

End user processing device 106 may be a handheld computing device, a tablet computer, a smartphone, a laptop computing device, a desktop computing device, or other type of computing device. In some embodiments, a user such as, for example, a manager, may provide input to one or more processing devices 104 via his or her end user processing device 106, may make queries to processing device 104 from end user processing device 106, and may receive or have access to reports or suggestions from processing device 104. Example inputs that a manager may provide via end user processing device 106 include, but are not limited to, productivity, turnaround time, utilization, attrition etc.

Processing device 104 may include a laptop computing device, a desktop computing device, a tablet computing device, or other type of computing device.

Databases 108, 110 and public sources 112, 114 may be accessible to processing device 104 via network 102.

Although FIG. 1 shows a single end user processing device 106, other operating environments, may include multiple end user processing devices 106. For example, an operating environment may include multiple end user processing devices 106 such as a separate end user processing device 106 for each manager. Similarly, a number of databases and public sources may vary in other operating environments according to embodiments of the invention.

Figure 2:
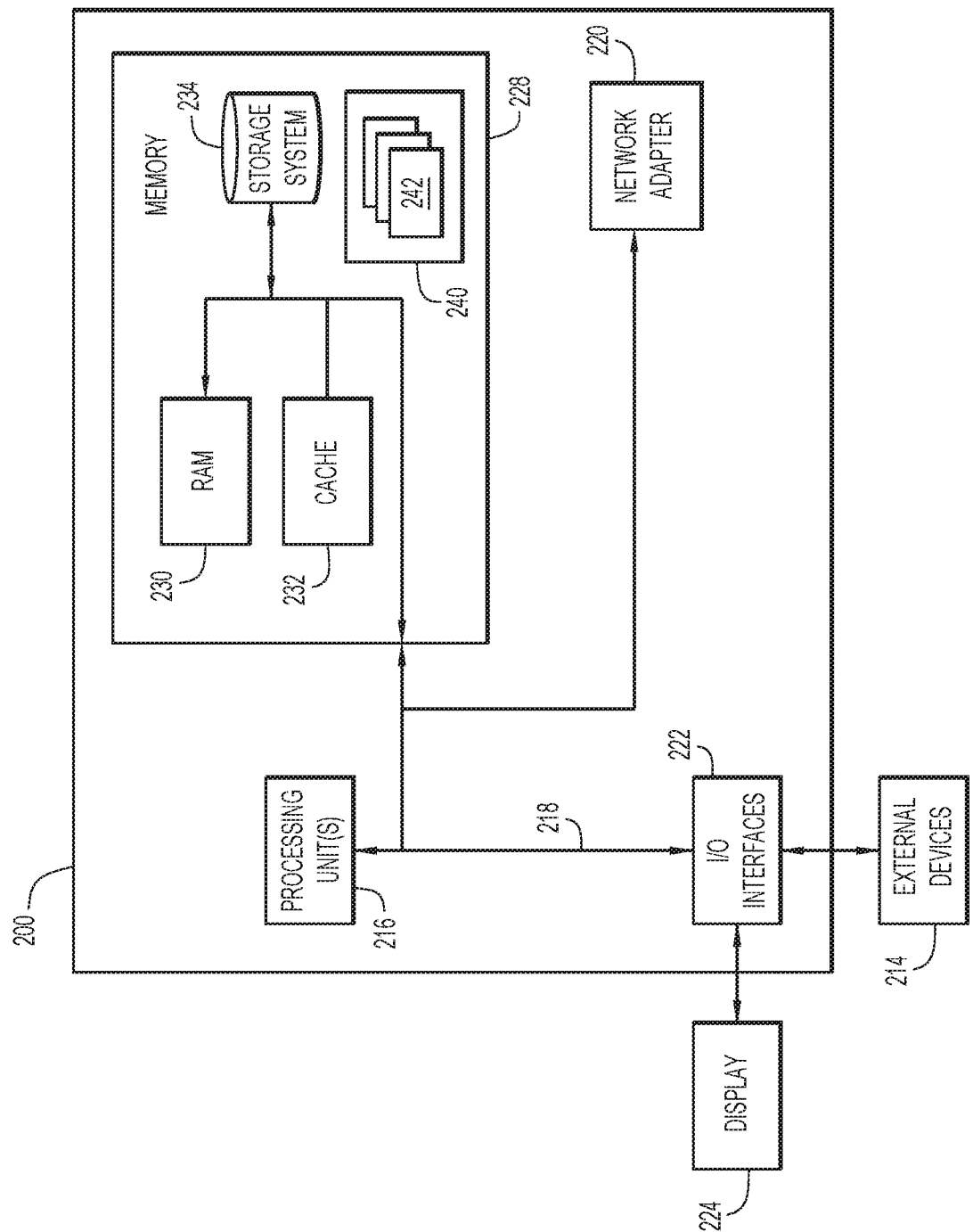
FIG. 2 is a functional block diagram of a general purpose computer for implementing embodiments of the invention.

Referring now to FIG. 2, a schematic of an example computer system 200 is shown, which may implement end user processing device 106 or processing device 104 in various embodiments. In some embodiments, multiple processing devices 104 may be configured to work together to respond to queries, produce reports, and provide suggestions to end users. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
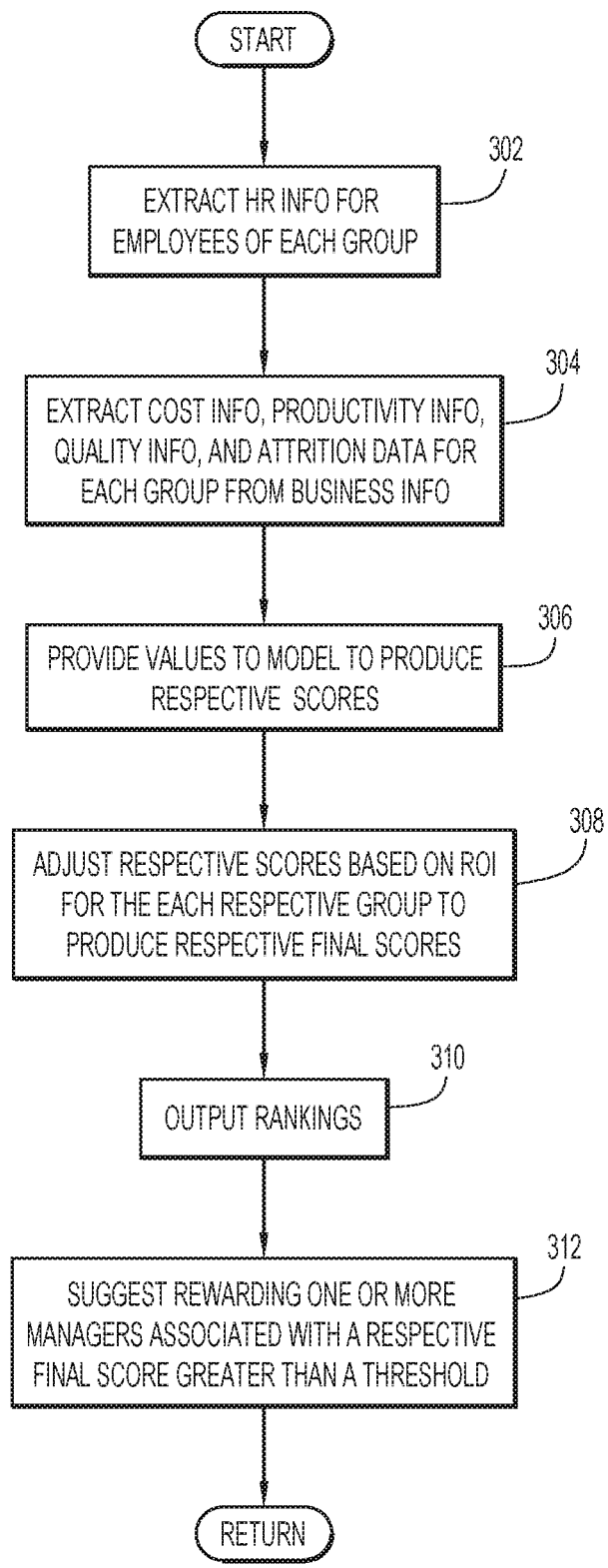
FIG. 3 is a flowchart illustrating an example process, according to embodiments of the invention, for ranking each respective group of a business unit and suggesting rewarding of one or more managers associated with one or more groups having a performance that is greater than a threshold.

FIG. 3 is a flowchart that illustrates an example process for processing device 104 to rank groups of a business unit according to embodiments of the invention. Processing device 104 may use machine learning to determine attributes and/or business metrics for highly performing groups. Historical data of groups within a business unit may be used to train a model (e.g., neural networks, mathematical/statistical models, classifiers, etc.) to learn patterns of attributes and/or business metrics associated with highly performing groups. For example, a highly performing group may be defined as a group having a return on investment that is greater than a predefined value such as, for example, 60% or another suitable value.

Return on investment (ROI) may be calculated according to $$\text{ROI} = (\text{"Gain from Investment"} - \text{"Cost of Investment"}) / \text{"Cost of Investment"}$$

"Gain from Investment" refers to proceeds obtained from the sale of an investment. Because ROI is measured as a percentage, it can be easily compared with returns from other investments. In the above example, ROI may be calculated for each group based on expenses (e.g., cost of investment) for each group including, but not limited to, employee salaries, cost of benefits for employees of the group, educational expenses for employees of the group, capital expenditures for the group, operating expenditures for the group, etc. and revenue generated by each group (e.g., gain from investment). As a result of the training via the machine learning, certain patterns of attributes and/or business metrics may be associated with highly performing groups.

The process may begin with processing device 104 extracting human resource information from human resource database 108 for employees of each respective group of a business unit (act 302). For each employee, the human resources information may include, but not be limited to age, education, skills, years of experience, salary, productivity, turnaround time, and utilization. Processing device 104 then may extract cost information, productivity information, quality information, and attrition data for each group from business information database 110 (act 304).

For each employee of each group, processing device 104 may provide values representing each item of the human resources information to the model along with values representing the cost information, the productivity information, the quality information, and the attrition data for each of the groups. The model may receive the values and produce a score between 0 and 100 that is directly proportional to an estimated probability that the group is likely a highly performing group (act 306).

Processing device 104 then may adjust the score to produce a respective final score for each group (act 308). According to some embodiments, when the ROI for the group is indicative of a highly performing group and the score is greater than a threshold, which may be 50, or another suitable value in some embodiments, then the score may be adjusted such that a final score is equal to (1.5× score). When the ROI for the group is not indicative of a highly performing group and the score is less than or equal to 50, or another suitable value in some embodiments, then the final score may be equal to 0.5×score. Processing device 104 may then rank the groups based on their respective final scores and output the rankings (act 310). In other embodiments, the final score may be calculated differently.

Processing device 104 may output the rankings to users, who may be managers, via their respective end user processing devices 106. In some embodiments, processing device 104 may suggest rewarding one or more managers associated with a respective one or more of the groups having a respective final score greater than a predefined threshold (act 312). The reward may include a promotion, a bonus, a promotion and a bonus, or other types of reward.

Figure 4:
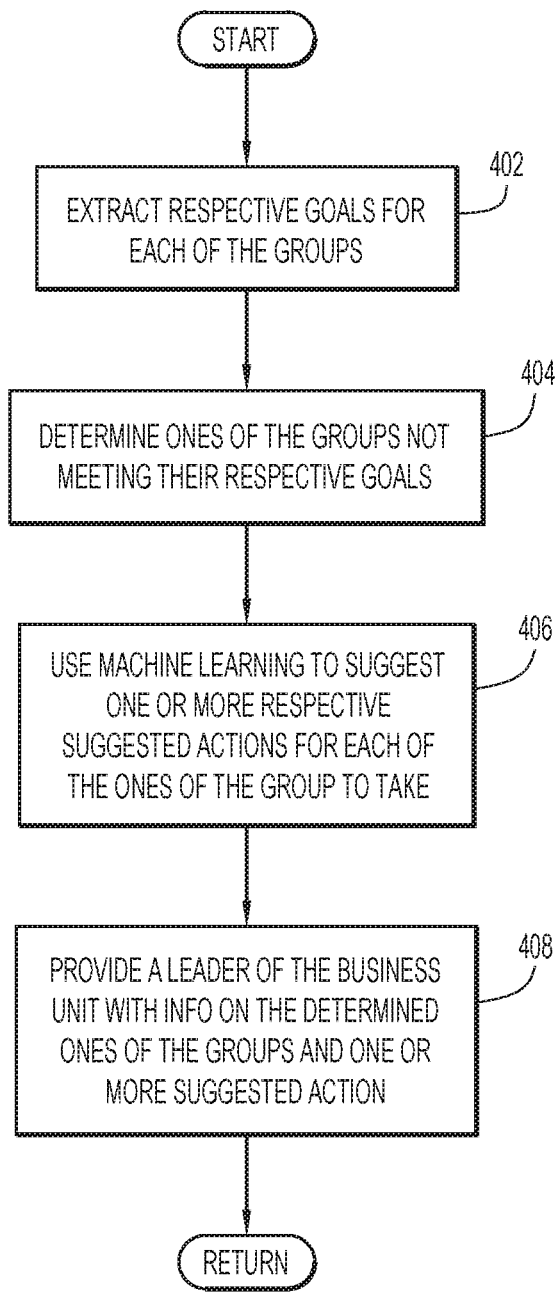
FIG. 4 is a flowchart illustrating an example process, according to embodiments of the invention, for determining groups of a business unit that are not meeting their respective goals and providing a leader of the business unit with information about the determined groups and suggested action.

In the various embodiments, each group may have respective goals including, but not limited to, productivity goals, profitability goals, quality goals, etc. FIG. 4 is a flowchart of a process that may be performed by processing device 104 according to at least some of the embodiments to determine which groups of a business unit are not meeting their respective goals. The process may begin by extracting respective goals for each of the groups of the business unit (act 402). The goals may be included in business information database 110 and may have been provided by respective managers of the different groups of the business unit via their respective end user processing devices 106. The goals may be standardized such that managers of respective groups of a business unit located anywhere in the world may provide a respective one or more goals selected from a standardized list of goals.

Processing device 104 may then determine which of the groups are not meeting their respective goals by accessing stored business information (act 404).

Processing device 104 may use machine learning to learn which actions previously helped a group that failed to meet its goals get back on track (act 406). Historical data of groups that failed to meet their respective goals, actions that were performed to try to get the groups back on track, and whether or not the actions resulted in the groups getting back on track to meet their respective goals may be used to train a model (e.g., neural networks, mathematical/statistical models, classifiers, etc.). For each of the groups not meeting its goals, processing device 104 may provide values representing the unmet goals, and information representing a percentage of the unmet goals that were met. For example, if a goal was to produce 100 widgets in a given period of time, but only 80 widgets were produced, then a percentage of the unmet goal that was met is 80%. The model may then return one or more suggested actions that have a highest estimated probability of successfully getting a group back on track to meet its goals.

Processing device 104 then may provide a user such as, for example, a leader of the business unit, with information regarding the groups that are determined not to be meeting their respective goals and suggesting one or more actions be taken (act 408). The one or more suggested actions may include, but not be limited to, assigning a respective new manager to each of the determined groups, reassigning specific employees of the determined groups to other groups and assigning other employees to the determined groups, terminating managers associated with at least some of the determined groups, terminating one or more least productive employees of the determined groups, and terminating some of the managers and some of the employees of the determined groups.

Figure 5:
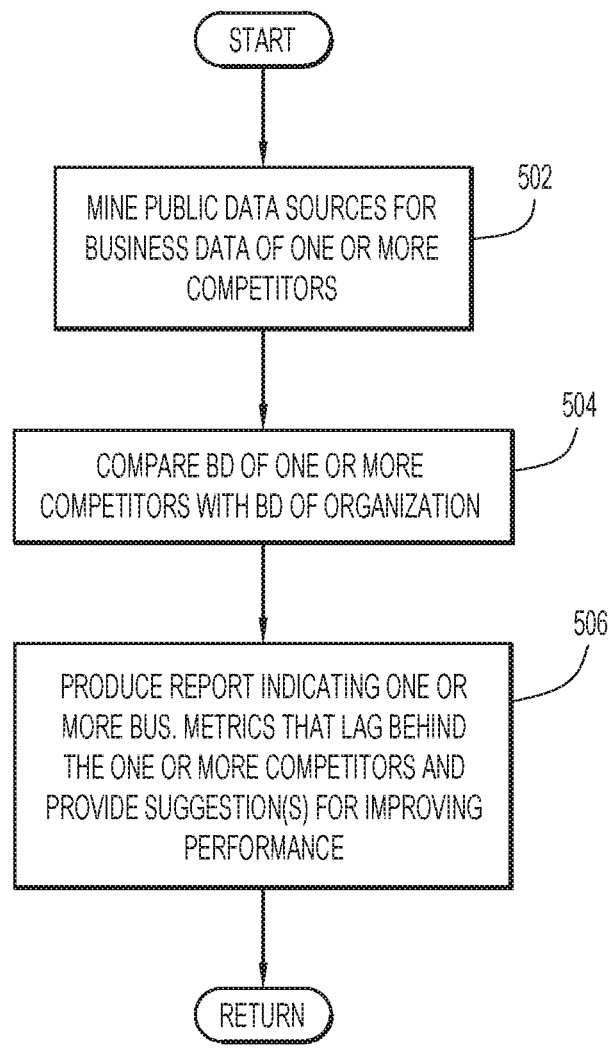
FIG. 5 is a flowchart illustrating an example process, according to embodiments of the invention, for obtaining competitor business data from public data sources and producing a report indicating business metrics of a business organization that lag behind business metrics of one or more competitors.

FIG. 5 is a flowchart of another example process that may be performed according to some embodiments of the invention. The process may begin with processing device 104 mining public data sources such as, for example, public sources 112, 114, for business data related to one or more competitors who produce at least one product or at least one service that competes with at least one product or at least one service of the business organization (act 502). Processing device 104 may compare business data of the one or more competitors with business data of the organization included in business information database 110 (act 504). Processing device 104 then may produce a report indicating one or more business metrics of the organization that lag behind one or more business metrics corresponding to at least some of the mined business data of the one or more competitors and may provide one or more suggestions for improving the one or more lagging business metrics (act 506). For example, the report may include, but not be limited to, lagging business metrics such as ROI, items produced (for products) or customers served (for services), profit, attrition, etc. The report also may include corresponding business metrics of the one or more competitors.

Processing device 104 may use machine learning based on historical business data to make the one or more suggestions to improve the lagging business metrics. Historical data of business organizations and actions taken to improve specific business metrics and whether or not the actions were successful may be used to train a model (e.g., neural networks, mathematical/statistical models, classifiers, etc.). Processing device 104 may provide values representing one or more lagging business metrics to the trained model, which may then return one or more suggested actions to take that have a highest estimated probability of successfully increasing the one or more lagging business metrics.

Figure 6:
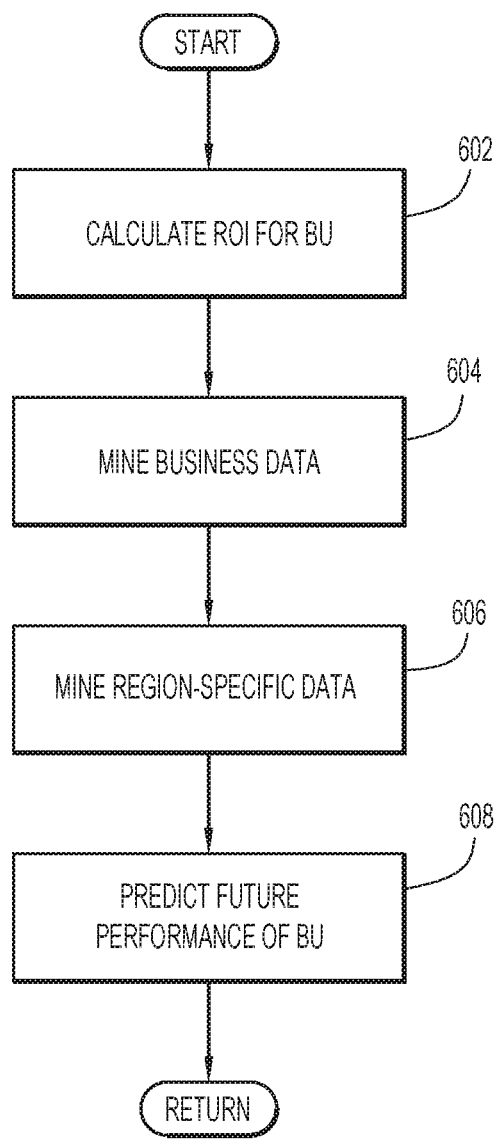
FIG. 6 is a flowchart illustrating an example process, according to embodiments of the invention, for calculating a return on investment for a business unit, mining business data and region-specific data, and predicting future performance of the business unit for a given period of time.

FIG. 6 illustrates an example process that may be performed by processing device 104 for predicting future performance of a business unit based at least partly on mined business data and mined region-specific data. The process may begin by calculating a return on investment for the business unit (act 602).

Processing device 104 then may mine business data, from public sources such as, for example, public sources 112, 114. Some examples of public sources that may be mined may include, but are not limited to, daily newspapers; financial, trade, and association magazines; databases, government statistics, directories, technical manuals, and more, which may be in electronic form. The business data may be related to products produced by the business unit and/or services provided by the business unit (act 604). Processing device 104 then may mine region-specific data from sources for regions in which at least one respective group of the groups of the business unit is located (act 606). The region-specific data may include any information for a region that may affect supply or demand for products produced by the business unit and/or services provided by the business unit. For example, region-specific data may include, but not be limited to, economic information for the region, proposed and existing laws and regulations for the region, government policy, unemployment rate, skills available in the region, number of qualified educational institutions in the region, per capita income for the region, capital expenditures, operating expenditures, cost per hire, competitor data from one or more public sources, etc.

Processing device 104 then may predict future performance of the business unit based at least partly on the mined data (act 608). Processing device 104 may use machine learning to train a model (e.g., neural networks, mathematical/statistical models, classifiers, etc.) using historical business and region-specific data as well as performance data, such as ROI or other data. Processing device may provide values representing the mined business and region-specific data to the trained model, which may provide information regarding predicted future performance based on an estimated probability of a future performance scenario as observed during training of the model. Embodiments may predict future performance for a predefined period of time such as, for example, two years or another period of time. In some embodiments, multiple models may be used to predict future performance for different periods of time.

Figure 7:
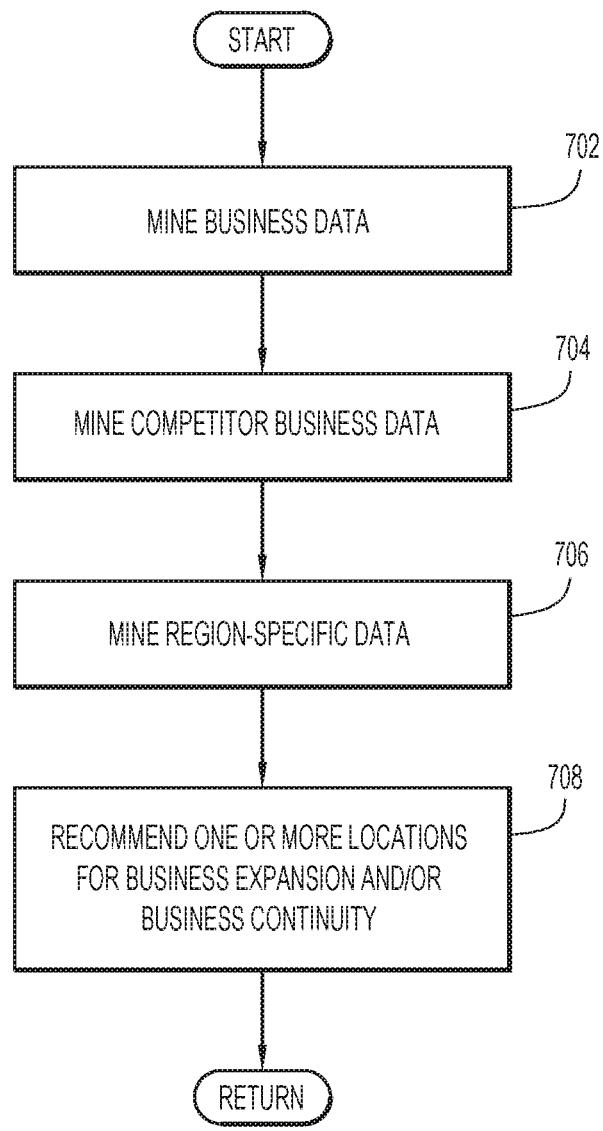
FIG. 7 is a flowchart illustrating an example process, according to embodiments of the invention, for mining business data of an organization, competitor business data, and region-specific business data, and recommending one or more locations for business expansion and/or business continuity.

FIG. 7 is a flowchart of an example process, according to embodiments of the invention, for mining data and recommending one or more locations for business expansion and/or business continuity. The process may begin with processing device 104 mining business data from public sources such as, for example, public sources 112, 114 (act 702). Some examples of public sources that may be mined may include, but are not limited to, daily newspapers; financial, trade and association magazines; databases, government statistics, directories, technical manuals, and more, which may be in electronic form. The business data may be related to products produced by a business organization and/or services provided by the business organization.

Processing device 104 then may mine competitor business data from multiple sources (act 704). The multiple sources may include public databases as well as other sources. Some examples of public sources that may be mined include, but are not limited to, annual reports of competitors, daily newspapers; financial, trade and association magazines; databases and more, which may be in electronic form.

Further, processing device 104 may mine region-specific data from multiple sources (act 706). The region-specific data may include any information for a region that may affect supply or demand for the products produced by the business unit and/or services provided by the business unit. For example, region-specific data may include, but not be limited to, economic information for the region, proposed and existing laws and regulations for the region, government policy, unemployment rate, skills available in the region, number of qualified educational institutions in the region, per capita salary for the region, capital expenditures, operating expenditures, cost per hire, competitor data from one or more public sources, etc. Processing device 104 may then recommend one or more locations for business expansion and/or business continuity based on analysis of the mined business data, competitor business data, and region-specific business data (act 708).

Processing device 104 may use machine learning to train a model (e.g., neural networks, mathematical/statistical models, classifiers, etc.) using historical business data, historical competitor business data, and historical region-specific data. Processing device may provide values representing the mined business data and region-specific data to the trained model, which may provide a recommendation of one or more locations for business expansion and/or business continuity. The historical business data may include, but not be limited to, business metrics for one or more businesses and one or more competitors, ROI, number of items produced, number of items sold, selling price of items, etc. Historical region-specific data may include data that may affect supply and/or demand for products and/or services of the one or more businesses. Examples of region-specific data include, but are not limited to, economic information for the region, proposed and existing laws and regulations for the region, government policy, unemployment rate, skills available in the region, number of qualified educational institutions in the region, per capita income for the region, etc.

Figure 8:
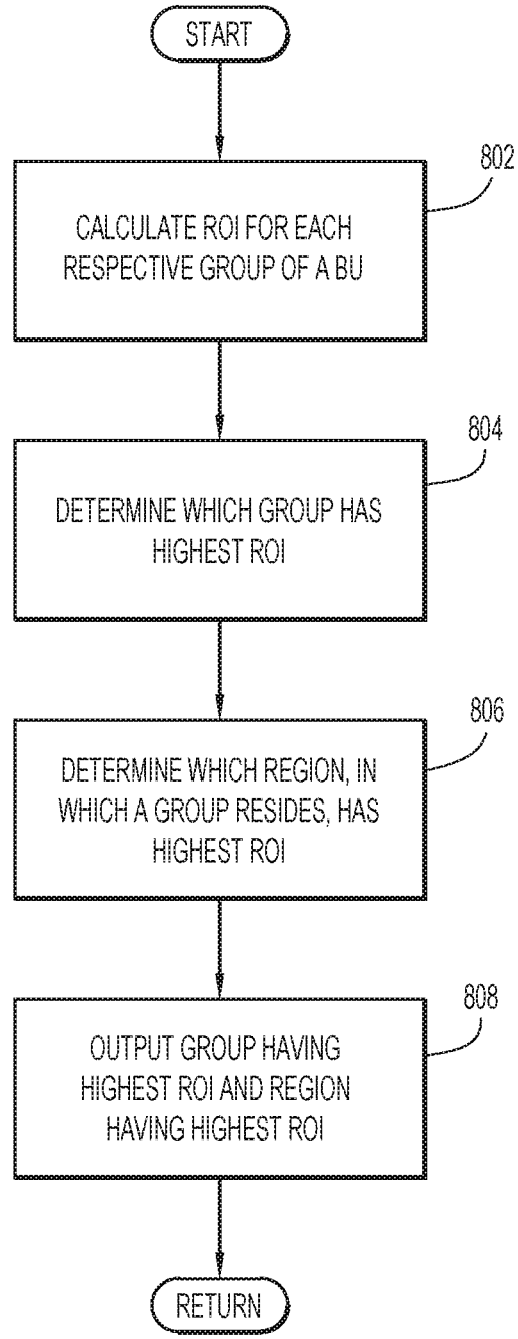
FIG. 8 is a flowchart illustrating an example process, according to embodiments of the invention, for determining a group of a business unit having a highest return on investment and a region, in which at least one group of the business unit resides, having a highest return on investment.

FIG. 8 is a flowchart that illustrates an example process that may be performed by processing device 104, according to embodiments of the invention, to determine which group of a business unit has a highest ROI and which region, in which a group resides, has a highest ROI. The process may begin with processing device 104 calculating a respective ROI for each group of the business unit (act 802) and then determining which of the groups has a highest ROI (act 804). Processing device 104 then may determine which region, in which a group of the business unit resides, has a highest ROI (act 806). An output may be produced indicating the group having the highest ROI and the region having the highest ROI (act 808). The output may be presented in a report, may be displayed on a display screen of end user processing device 106, or may be provided via other means.

It will be appreciated that the embodiments described above and illustrated in the drawings represent only a few of the many ways of implementing embodiments.

It is recommended that human resources databases and business information databases maintained by a business organization, and accessed according to embodiments of the invention, be kept up-to-date. For example, leaders, or managers, of various groups of a business unit may keep up-to-date goals for their respective groups in the business information databases. The goals may be associated with measurable business criteria that are uniformly calculated within the business unit. Similarly, each group manager may update group-related business details on a regular basis. The group-related business details may include, but not be limited to, group size, number of work items, quality, turnaround time, utilization, productivity, attrition, major business achievements, etc.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among various processing systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for performing cognitive analytics, the computer-implemented method comprising:
    extracting, by a processing device, for respective groups of a plurality of groups of a business unit of an organization, human resource information from stored business information, the human resource information including, for employees of the respective groups, salary information and employee experience information;
    extracting, by the processing device, for the respective groups, cost information, productivity information, quality information, and attrition data from the business information;
    identifying, by the processing device, highly performing groups, wherein a highly performing group has a return on investment greater than sixty percent and a percentage of the return on investment is based on a difference between a gain and cost of investment divided by the cost of investment;
    training, by the processing device, a model via machine learning based on historical data of groups within the business unit to learn patterns of attributes and business metrics associated with the highly performing groups, wherein the model includes a neural network and is trained to produce a score proportional to a probability a group is a highly performing group;
    providing, by the processing device, for the respective groups, at least the human resources information, the cost information, the productivity information, the quality information, and the attrition data to the model trained via machine learning, the model producing respective scores for the plurality of groups;
    increasing the score for a respective group based on a first weight in response to the respective group having a return on investment indicating a highly performing group and the score satisfying a score threshold;
    decreasing the score for the respective group based on a second weight in response to the respective group having a return on investment not indicating a highly performing group and the score failing to satisfy the score threshold;
    ranking, by the processing device, the plurality of groups based at least partly on the respective scores;
    outputting, by the processing device, the ranking of the plurality of groups;
    obtaining, by the processing device, business data of one or more competitors from one or more public sources;
    comparing, by the processing device, the business data of the one or more competitors with business data of the organization related to at least one of one or more products and one or more services common to the competitor and the organization to determine one or more business metrics of the organization that are lagging behind one or more business metrics of the one or more competitors;

training, by the processing device, a second model via machine learning based on historical data of business organizations, actions taken to improve specific business metrics, and success of the actions, wherein the second model includes a second neural network and is trained to produce one or more actions with a highest probability of increasing business metrics;

providing, by the processing device, values representing the one or more lagging business metrics to the second model trained via machine learning, the second model producing one or more actions having a highest probability of increasing the one or more lagging business metrics;

generating, by the processing device, a user interface with a plurality of interface screens;

outputting, by the processing device, the one or more actions produced from the second model for increasing the one or more lagging business metrics on the plurality of interface screens of the user interface;

navigating, by the processing device, between the plurality of interface screens to initiate the one or more actions from the user interface; and maintaining, by the processing device, the stored business information up-to-date on a regular basis and updating the model and the second model on the regular basis by:
  training the model via machine learning to update the learned patterns of attributes and business metrics according to groups indicated as highly performing by the model, wherein the model is trained based on updated historical data of groups within the business unit including the groups indicated as highly performing by the model; and
  training the second model via machine learning based on updated historical data of business organizations, updated actions produced by the second model and taken to improve specific business metrics, and updated success of the actions produced by the second model to produce one or more updated actions with a highest probability of increasing business metrics.

2. The computer-implemented method of claim 1, wherein the cost information comprises capital expenditures, operating expenditures and at least one of travel costs, training costs, and costs per employee.

3. The computer-implemented method of claim 1, wherein:
the business information includes corresponding goals for the respective groups of the plurality of groups; and
the computer-implemented method further comprises:
  determining, by the processing device, ones of the respective groups that are not reaching the corresponding goals, and
  providing, by the processing device, information regarding the determined ones of the respective groups that are not meeting the corresponding goals and suggesting that action be taken regarding the determined ones of the respective groups.

4. The computer-implemented method of claim 1, further comprising:
producing, by the processing device, a report indicating the one or more business metrics of the organization that are lagging behind the one or more business metrics of the one or more competitors based, at least partially on the comparing of the business data of the one or more competitors with the business data of the organization.

5. The computer-implemented method of claim 1, further comprising:
calculating, by the processing device, a return on investment for the business unit;
mining, by the processing device, organization business data from public sources, the organization business data being related to at least one of products produced by the organization and services provided by the organization;
mining, by the processing device, region-specific data from a plurality of public sources for regions in which at least one respective group of the plurality of groups is located; and
predicting, by the processing device, future performance of the business unit based at least partly on the mined organization business data and the mined region-specific data.

6. The computer implemented method of claim 1, further comprising:
mining, by the processing device, organization business data from public sources, the organization business data being related to at least one of products produced by the organization and services provided by the organization;
mining, by the processing device, competitor business data from public sources;
mining, by the processing device, region-specific data from a plurality of sources; and
recommending, by the processing device, one or more locations for at least one of business expansion and business continuity based on analysis of the mined organization business data, competitor business data, and region-specific business data.

7. A system for performing cognitive analytics, the system comprising:
at least one processor; and
a memory connected with the at least one processor, wherein the at least one processor is configured to perform:
  extracting, for respective groups of a plurality of groups of a business unit of an organization, human resource information from stored business information, the human resource information including, for employees of the respective groups, salary information and employee experience information;
  extracting, for the respective groups, cost information, productivity information, quality information, and attrition data from the business information;
  identifying highly performing groups, wherein a highly performing group has a return on investment greater than sixty percent and a percentage of the return on investment is based on a difference between a gain and cost of investment divided by the cost of investment;
  training a model via machine learning based on historical data of groups within the business unit to learn patterns of attributes and business metrics associated with the highly performing groups, wherein the model includes a neural network and is trained to produce a score proportional to a probability a group is a highly performing group;
  providing, for the respective groups, at least the human resources information, the cost information, the productivity information, the quality information, and the attrition data to the model trained via machine learning, the model producing respective scores for the plurality of groups;

increasing the score for a respective group based on a first weight in response to the respective group having a return on investment indicating a highly performing group and the score satisfying a score threshold;

decreasing the score for the respective group based on a second weight in response to the respective group having a return on investment not indicating a highly performing group and the score failing to satisfy the score threshold;

ranking the plurality of groups based at least partly on the respective scores;

outputting the ranking of the plurality of groups;

obtaining business data of one or more competitors from one or more public sources;

comparing the business data of the one or more competitors with business data of the organization related to at least one of one or more products and one or more services common to the competitor and the organization to determine one or more business metrics of the organization that are lagging behind one or more business metrics of the one or more competitors;

training a second model via machine learning based on historical data of business organizations, actions taken to improve specific business metrics, and success of the actions, wherein the second model includes a second neural network and is trained to produce one or more actions with a highest probability of increasing business metrics;

providing values representing the one or more lagging business metrics to the second model trained via machine learning, the second model producing one or more actions having a highest probability of increasing the one or more lagging business metrics;

generating a user interface with a plurality of interface screens;

outputting the one or more actions produced from the second model for increasing the one or more lagging business metrics on the plurality of interface screens of the user interface;

navigating between the plurality of interface screens to initiate the one or more actions from the user interface; and maintaining the stored business information up-to-date on a regular basis and updating the model and the second model on the regular basis by:
   training the model via machine learning to update the learned patterns of attributes and business metrics according to groups indicated as highly performing by the model, wherein the model is trained based on updated historical data of groups within the business unit including the groups indicated as highly performing by the model; and
   training the second model via machine learning based on updated historical data of business organizations, updated actions produced by the second model and taken to improve specific business metrics, and updated success of the actions produced by the second model to produce one or more updated actions with a highest probability of increasing business metrics.

8. The system of claim 7, wherein the cost information comprises capital expenditures, operating expenditures and at least one of travel costs, training costs, and costs per employee.

9. The system of claim 7, wherein:
the business information includes corresponding goals for the respective groups of the plurality of groups; and
the at least one processor is further configured to perform:
   determining ones of the respective groups that are not reaching the corresponding goals, and
   providing information regarding the determined ones of the respective groups that are not meeting the corresponding goals and suggesting that action be taken regarding the determined ones of the respective groups.

10. The system of claim 7, wherein the at least one processor is further configured to perform:
producing a report indicating the one or more business metrics of the organization that are lagging behind the one or more business metrics of the one or more competitors based, at least partially on the comparing of the business data of the one or more competitors with the business data of the organization.

11. The system of claim 7, wherein the at least one processor is further configured to perform:
suggesting one or more managers to be rewarded, the one or more managers being associated with a respective one or more of the plurality of groups having a performance measurement that exceeds a threshold.

12. The system of claim 7, wherein the at least one processor is further configured to perform:
mining organization business data from public sources, the organization business data being related to at least one of products produced by the organization and services provided by the organization;
mining competitor business data from public sources;
mining region-specific data from a plurality of sources; and
recommending one or more locations for at least one of business expansion and business continuity based on analysis of the mined organization business data, the competitor business data, and the region-specific business data.

13. A computer program product comprising at least one computer readable storage medium having computer readable program code embodied therewith for execution on at least one processor of a computing device, the computer readable program code being configured to:
extract, for respective groups of a plurality of groups of a business unit of an organization, human resource information from stored business information, the human resource information including, for employees of the respective groups, salary information and employee experience information;
extract, for the respective groups, cost information, productivity information, quality information, and attrition data from the business information;
identify highly performing groups, wherein a highly performing group has a return on investment greater than sixty percent and a percentage of the return on investment is based on a difference between a gain and cost of investment divided by the cost of investment;
train a model via machine learning based on historical data of groups within the business unit to learn patterns of attributes and business metrics associated with the highly performing groups, wherein the model includes a neural network and is trained to produce a score proportional to a probability a group is a highly performing group;

provide, for the respective groups, at least the human resources information, the cost information, the productivity information, the quality information, and the attrition data to the model trained via machine learning, the model producing respective scores for the plurality of groups;

increase the score for a respective group based on a first weight in response to the respective group having a return on investment indicating a highly performing group and the score satisfying a score threshold;

decrease the score for the respective group based on a second weight in response to the respective group having a return on investment not indicating a highly performing group and the score failing to satisfy the score threshold;

rank the plurality of groups based at least partly on the respective scores;

output the ranking of the plurality of groups;

obtain business data of one or more competitors from one or more public sources;

compare the business data of the one or more competitors with business data of the organization related to at least one of one or more products and one or more services common to the competitor and the organization to determine one or more business metrics of the organization that are lagging behind one or more business metrics of the one or more competitors;

train a second model via machine learning based on historical data of business organizations, actions taken to improve specific business metrics, and success of the actions, wherein the second model includes a second neural network and is trained to produce one or more actions with a highest probability of increasing business metrics;

provide values representing the one or more lagging business metrics to the second model trained via machine learning, the second model producing one or more actions having a highest probability of increasing the one or more lagging business metrics;

generate a user interface with a plurality of interface screens;

output the one or more actions produced from the second model for increasing the one or more lagging business metrics on the plurality of interface screens of the user interface;

navigate between the plurality of interface screens to initiate the one or more actions from the user interface; and maintain the stored business information up-to-date on a regular basis and update the model and the second model on the regular basis by:

training the model via machine learning to update the learned patterns of attributes and business metrics according to groups indicated as highly performing by the model, wherein the model is trained based on updated historical data of groups within the business unit including the groups indicated as highly performing by the model; and training the second model via machine learning based on updated historical data of business organizations, updated actions produced by the second model and taken to improve specific business metrics, and updated success of the actions produced by the second model to produce one or more updated actions with a highest probability of increasing business metrics.

14. The computer program product of claim 13, wherein:

the business information includes corresponding goals for the respective groups of the plurality of groups, and the computer readable program code is further configured to:

determine ones of the respective groups that are not reaching the corresponding goals; and provide information regarding the determined ones of the respective groups that are not meeting the corresponding goals and suggesting that action be taken regarding the determined ones of the respective groups.

15. The computer program product of claim 13, wherein the computer readable program code is further configured to:

produce a report indicating the one or more business metrics of the organization that are lagging behind the one or more business metrics of the one or more competitors based, at least partially on the comparing of the business data of the one or more competitors with the business data of the organization.

16. The computer program product of claim 13, wherein the computer readable program code is further configured to:

suggest one or more managers to be rewarded, the one or more managers being associated with a respective one or more of the plurality of groups having a performance measurement that exceeds a threshold.

17. The computer program product of claim 13, wherein the computer readable program code is further configured to:

calculate corresponding returns on investment for respective groups of the plurality groups; and determine which of the plurality of groups has a highest return on investment and which of a plurality of regions, in which at least one of the respective groups of the plurality of groups is located, has a highest return on investment.

* * * * *